US012219672B2

(12) United States Patent
Zhou

(10) Patent No.: US 12,219,672 B2
(45) Date of Patent: Feb. 4, 2025

(54) SAFE HEATING CIRCUIT AND ELECTRIC BLANKET PROVIDED WITH SAFE HEATING CIRCUIT

(71) Applicant: North Star Home LLC, Libertyville, IL (US)

(72) Inventor: Min Zhou, Ningbo (CN)

(73) Assignee: North Star Home LLC, Libertyville, IL (US)

( * ) Notice: Subject to any disclaimer, the term of this patent is extended or adjusted under 35 U.S.C. 154(b) by 750 days.

(21) Appl. No.: 17/518,185

(22) Filed: Nov. 3, 2021

(65) Prior Publication Data

US 2023/0056786 A1 Feb. 23, 2023

(30) Foreign Application Priority Data

Aug. 18, 2021 (CN) ........................ 202110950605.7

(51) Int. Cl.
*H05B 3/34* (2006.01)
*H05B 1/02* (2006.01)

(52) U.S. Cl.
CPC ............ *H05B 3/34* (2013.01); *H05B 1/0202* (2013.01); *H05B 2203/019* (2013.01); *H05B 2203/02* (2013.01)

(58) Field of Classification Search
CPC ................ H05B 1/0202; H05B 1/0272; H05B 2203/019; H05B 2203/02; H05B 3/34
See application file for complete search history.

(56) References Cited

U.S. PATENT DOCUMENTS 8,383,992 B2 * 2/2013 Wang ...................... H05B 3/56 219/490
2011/0049128 A1 * 3/2011 Chow .................. G05D 23/24 219/494
2020/0256899 A1 * 8/2020 Breitlow ............. G01R 19/225

* cited by examiner

*Primary Examiner* — Joe E Mills, Jr.
(74) *Attorney, Agent, or Firm* — Prospect Law LLP

(57) ABSTRACT

A safe heating circuit includes a PTC electric heating element; a first switching element, coupled into a ground loop of the PTC element and configured to switch on or off a power loop of the PTC element based on an on-off control signal; a first voltage acquisition circuit, configured to sample a first temperature voltage based on a ground current of the PTC element; an NTC element, disposed between the PTC element and a sensing element; the sensing element, configured to receive a leakage current from the PTC element transmitted by the NTC element; a second voltage acquisition circuit, configured to sample a second temperature voltage based on the leakage current; and a controller, that compares the first or second temperature voltage to a set temperature voltage and output the on-off control signal based on a comparison result.

17 Claims, 9 Drawing Sheets

SAFE HEATING CIRCUIT AND ELECTRIC BLANKET PROVIDED WITH SAFE HEATING CIRCUIT

TECHNICAL FIELD

The present invention relates to an electric heating heat preservation apparatus, in particular to a safe heating circuit and an electric blanket provided with the safe heating circuit.

BACKGROUND ART

An electric blanket is a common household appliance, mainly used to increase the temperature in bed when people sleep to achieve the purpose of warming. The electric blanket has the advantages of low power consumption, adjustable temperature, convenience in use and wide application, and has a history of more than 100 years.

However, if the electric blanket is not maintained well while being used, an electric leakage or fire may occur, which will threaten the lives of users. Such a similar situation occurs usually because the temperature control of the electric heating wire is inaccurate, or because the aging of key elements such as the electric heating wire, a switching element or a temperature sensing element leads to a short circuit or an open circuit, which makes the local temperature of the electric blanket too high. At this time, a fire easily occurs if a fault cannot be detected, and a power supply cannot be switched off in time.

Therefore, inventors of the present invention strive to solve these problems and other problems.

SUMMARY OF THE INVENTION

The present invention aims at solving the technical problems to provide a safe heating circuit in a Positive Temperature Coefficient (PTC)+Negative Temperature Coefficient (NTC) temperature control mode, a key element short-circuit or open-circuit detection protection circuit is configured, a heating temperature can be precisely controlled, a fault can be timely detected, and a power supply can be timely switched off, so as to ensure the safety of the life and property of a user.

In one aspect, the present invention discloses a safe heating circuit, including: a PTC electric heating element, generating heat when being electrified; a first switching element, coupled into a ground loop of the PTC electric heating element and configured to switch on or off a power loop of the PTC electric heating element based on an on-off control signal; a first voltage acquisition circuit, configured to sample a first temperature voltage based on a ground current of the PTC electric heating element; an NTC element, disposed between the PTC electric heating element and a sensing element; the sensing element, configured to receive a leakage current from the PTC electric heating element transmitted by the NTC element; a second voltage acquisition circuit, configured to sample a second temperature voltage based on the leakage current; and a controller, configured to compare the first temperature voltage or the second temperature voltage to a set temperature voltage and output the on-off control signal based on a comparison result.

In some embodiments, the first switching element is a silicon-controlled rectifier element, and the controller outputs a continuous trigger pulse used as the on-off control signal to control the silicon-controlled rectifier element to be switched on.

In some embodiments, the first voltage acquisition circuit includes a first sampling resistor coupled between the first switching element and a power ground, and a first filter circuit coupled to the first sampling resistor, and one signal input terminal of the controller is coupled to the first filter circuit to receive a sampling signal.

In some embodiments, the second voltage acquisition circuit includes a voltage divider circuit coupled to a current flow-out terminal of the sensing element, and a second filter circuit coupled to the voltage divider circuit, and one signal input terminal of the controller is coupled to the second filter circuit to receive a sampling signal.

In some embodiments, the safe heating circuit of the present invention further includes a level adjusting circuit, the level adjusting circuit is coupled to one signal input terminal of the controller and configured to generate a level adjusting signal, and the controller is further configured to adjust the set temperature voltage based on the level adjusting signal.

In some embodiments, the safe heating circuit of the present invention further includes a display circuit, the display circuit is coupled to at least one signal output terminal of the controller and configured to display a current setting level based on a display control signal output by the controller.

In some embodiments, the safe heating circuit of the present invention further includes a third voltage acquisition circuit, the third voltage acquisition circuit is coupled to a power supply end of the first switching element, and the controller is further configured to detect an open-circuit voltage acquired by the third voltage acquisition circuit when the first switching element is switched off, judge the PTC electric heating element and the first switching element to be in a normal state if the open-circuit voltage is at a high level, and judge the PTC electric heating element or the first switching element to be in a fault state if the open-circuit voltage is at a low level.

In some embodiments, the controller is further configured to detect the first temperature voltage and compare the first temperature voltage to a first preset threshold value when detecting that the open-circuit voltage is at the low level in a switch-off state of the first switching element, judge the PTC electric heating element to be in a fault state if the first temperature voltage is lower than the first preset threshold value, and judges the first switching element to be in a fault state if the first temperature voltage is higher than the first preset threshold value.

In some embodiments, the third voltage acquisition circuit includes a first comparator, a positive input terminal of the first comparator is coupled to a power supply end of the first switching element through a third filter circuit and a first current limiting circuit, a reverse input terminal is configured to receive a reference voltage, and an output terminal is coupled to one signal input terminal of the controller.

In some embodiments, the safe heating circuit of the present invention further includes a fuse protection circuit, the fuse protection circuit includes a fuse coupled between a power terminal and the PTC electric heating element, and a second switching element coupled between a current flow-out terminal of the fuse and the power ground, and the controller is further configured to output a control signal to control the second switching element to be switched on so as to blow the fuse when judging that the first switching element is in a fault state.

In some embodiments, the safe heating circuit of the present invention further includes a sensing element detection circuit, and the sensing element detection circuit includes a second current limiting circuit and a fourth voltage acquisition circuit; a current flow-in terminal of the second current limiting circuit is coupled to a power terminal, and the current flow-out terminal is coupled to the current flow-in terminal of the sensing element and a sampling terminal of the fourth voltage acquisition circuit; the fourth voltage acquisition circuit is configured to sample a load voltage of the current flow-in terminal of the sensing element; and the controller is further configured to receive the load voltage, compare the load voltage to a second preset threshold value, and switch off the first switching element when the load voltage is higher than the second preset threshold value.

In some embodiments, the fourth voltage acquisition circuit includes a second comparator, a positive input terminal of the second comparator is coupled to a current flow-out terminal of the second current limiting circuit through a fourth filter circuit and a third current limiting circuit, a reverse input terminal is grounded, and an output terminal is coupled to one signal input terminal of the controller.

In some embodiments, the safe heating circuit of the present invention further includes a power supply circuit, the power supply circuit is coupled to an external power supply to provide an alternating-current voltage for the PTC electric heating element and is provided with a voltage conversion circuit, and the voltage conversion circuit is configured to convert the alternating-current voltage into a low-voltage direct-current power supply.

In some embodiments, the safe heating circuit of the present invention further includes a power supply voltage detection circuit, the power supply voltage detection circuit is coupled between the power supply end of the PTC electric heating element and one signal input terminal of the controller, and is configured to detect a power supply end voltage of the PTC electric heating element, and the controller is further configured to adjust the set temperature voltage based on the power supply end voltage of the PTC electric heating element detected by the power supply voltage detection circuit.

In some embodiments, the safe heating circuit of the present invention further includes a zero-crossing detection circuit, and the zero-crossing detection circuit is coupled between the power supply end of the PTC electric heating element and one signal input terminal of the controller, and includes at least one current limiting resistor, a filter capacitor and a clamping and switching diode.

In another aspect, the present invention further discloses an electric blanket, including: a blanket body; and the safe heating circuit according to the first aspect, wherein the PTC electric heating element is an electric heating wire distributed in the blanket body and having PTC characteristics.

In some embodiments, the PTC electric heating element, the NTC element and the sensing element are in integral integrated arrangement, the PTC electric heating element is an electric heating wire spirally wound on a core, the NTC element is an NTC material layer wrapping the electric heating wire, and the sensing element is a sensing wire spirally wound on the NTC material layer, and is externally provided with a shielding layer and an insulation layer wrapping the sensing wire.

The safe heating circuit of the present invention adopts a PTC+NTC temperature control mode, and can precisely control a heating temperature. At the same time, a key element short-circuit or open-circuit detection circuit is configured, a power supply can be timely switched off when a local temperature of the electric heating wire is too high or the key element is in an open-circuit/short-circuit state, and the occurrence of a fire is prevented, so as to ensure the life and property safety of a user.

DETAILED DESCRIPTION

In order to further understand the present invention, preferred implementations of the present invention will be described below in conjunction with embodiments. However, it should be understood that these descriptions are made to illustrate the general principles of the present invention and should not be considered as limiting.

It should be noted that the terms “first”, “second”, and the like in the specification and claims of the present invention and the foregoing drawings are used to distinguish similar objects and do not necessarily describe a specific sequence or order. It should be understood that the data used as such may be interchanged where appropriate so that the embodiments of the present invention described herein can be implemented in an order other than the order illustrated or described herein. In addition, the terms “include”, “comprise” and any other variations are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

In the specification and claims of the present invention, "coupled" includes both a direct connection and an indirect connection, such as a connection via an electrically conductive medium (for example, a conductor) which may contain a parasitic inductance or parasitic capacitance, and may further include a connection via other active devices or passive devices on the basis of achieving the same or similar functional purposes, such as a connection via a switching or follower circuit or other circuits or components.

Figure 1:
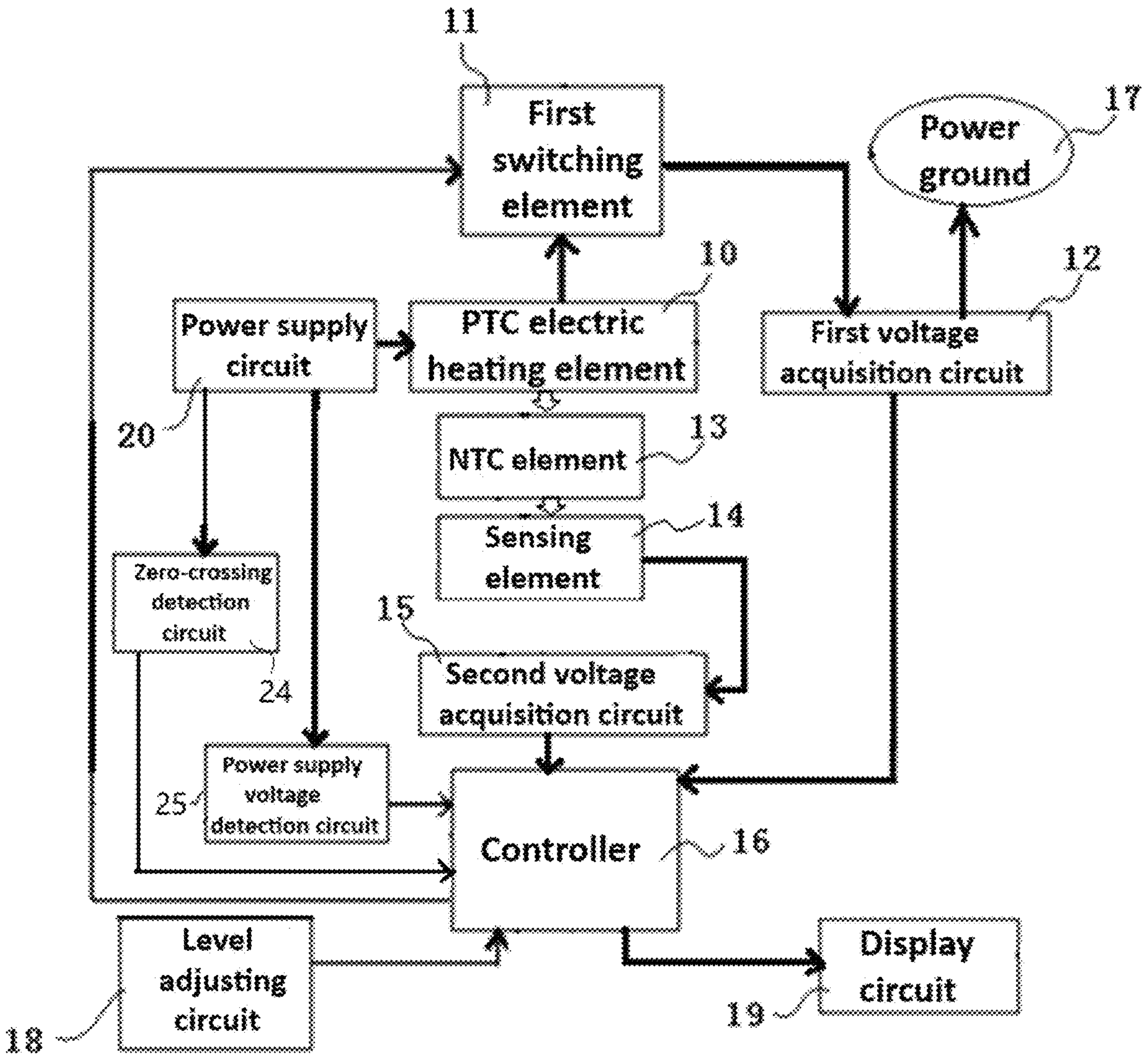
FIG. 1 is a functional block diagram of one example embodiment of a safe heating circuit of the present invention.

FIG. 1 is a functional block diagram of a safe heating circuit in one example embodiment of the present invention. Referring to FIG. 1, a safe heating circuit includes: a positive temperature coefficient ("PTC") electric heating element 10, generating heat when being electrified; a first switching element 11, coupled into a ground loop of the PTC electric heating element 10 and configured to switch on or off a power loop of the PTC electric heating element 10 based on an on-off control signal; a first voltage acquisition circuit 12, configured to sample a first temperature voltage based on a ground current of the PTC electric heating element 10; a negative temperature coefficient ("NTC") element 13, disposed between the PTC electric heating element 10 and a sensing element 14; the sensing element 14, configured to receive a leakage current from the PTC electric heating element 10 transmitted by the NTC element 13; a second voltage acquisition circuit 15, configured to sample a second temperature voltage based on the leakage current; and a controller 16, configured to compare the first temperature voltage or the second temperature voltage to a set temperature voltage and output the on-off control signal based on a comparison result.

Specifically, the PTC electric heating element 10 is made of an electric heating material with PTC characteristics, may generate heat after being electrified, and may change the own resistance when the temperature changes (a resistance value is greater if the temperature is higher). One end of the PTC electric heating element is coupled to a power supply circuit 20, and the other end is coupled to a power ground 17 through the first switching element 11. Therefore, when the first switching element 11 is switched on or turned on, a current passes through the PTC electric heating element 10, and the PTC electric heating element generates heat. When the first switching element 11 is switched off or turned off, no current passes through the PTC electric heating element 10, and heating is stopped. The NTC element 13 is made of a material with NTC characteristics, the resistance becomes small when the temperature rises, so that the leakage current flowing in from the PTC electric heating element in contact with the NTC element increases. The sensing element 14 is made of a conductive material, is in contact with the NTC element 13, and receives the leakage current flowing in through the PTC electric heating element.

Figure 2:
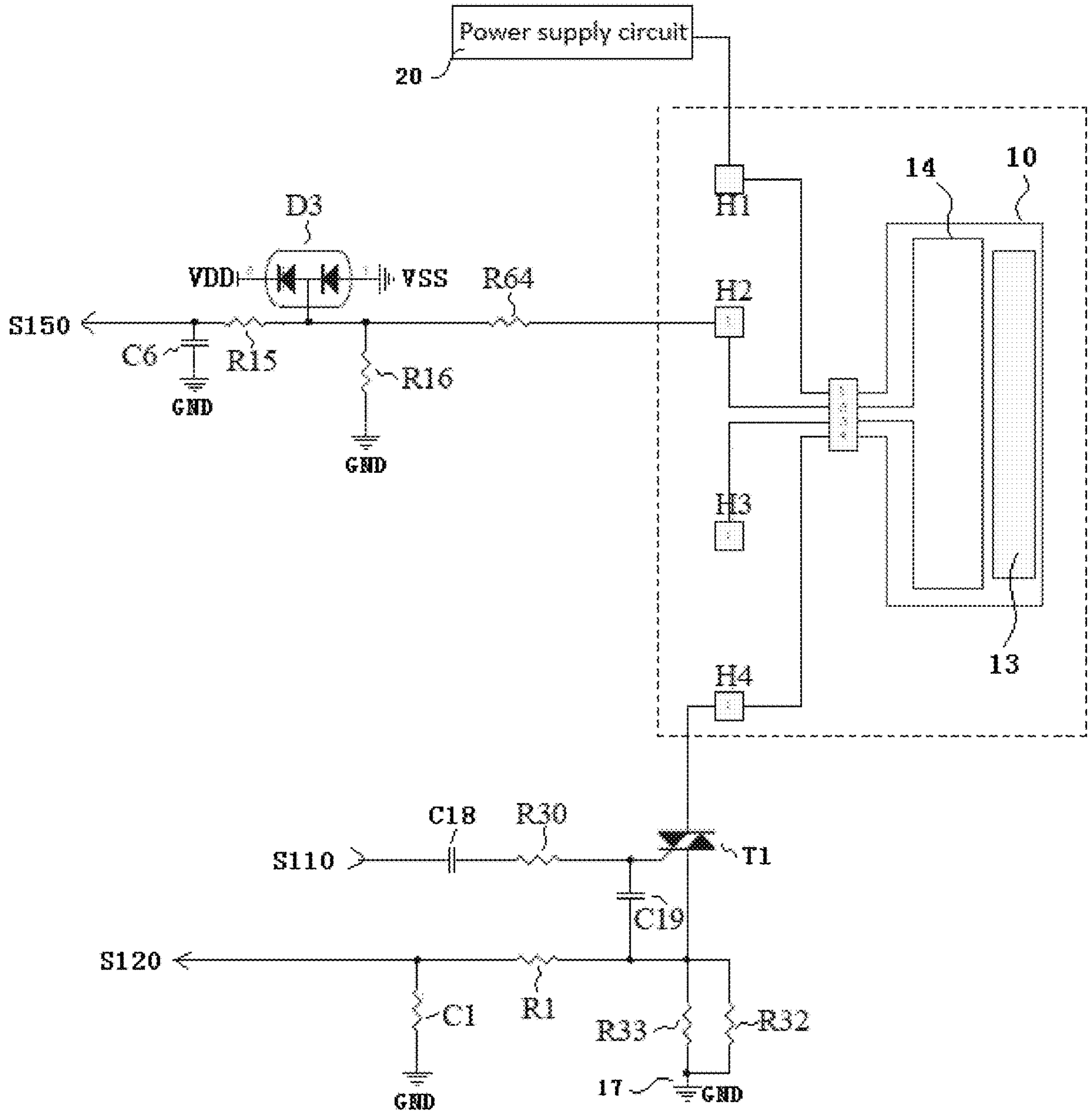
FIG. 2 is a schematic circuit diagram of one example embodiment of the safe heating circuit of the present invention.

Referring to FIG. 2, in some embodiments, a first connection terminal H1 of the PTC electric heating element 10 is coupled to the power supply circuit to receive an AC voltage, and a second connection terminal H4 is grounded through a first switching element (T1). The NTC element 13 is disposed between the PTC electric heating element 10 and the sensing element 14, and the sensing element 14 is configured to receive a leakage current from the PTC electric heating element 10 transmitted from the NTC element 13.

Referring to FIG. 2, in one illustrative embodiment, the first switching element is a silicon-controlled rectifier element T1, a control signal input terminal of the first switching element is coupled to one signal output terminal of the controller through a resistor R30 and a capacitor C18, and the first switching element is configured to receive an on-off control signal S110. Optionally, the on-off control signal S110 is a continuous trigger pulse, the silicon-controlled rectifier element T1 is switched on when receiving the continuous trigger pulse output by the controller, and otherwise, the silicon-controlled rectifier element T1 is in a switch-off state.

Referring to FIG. 2, in one illustrative embodiment, the first voltage acquisition circuit includes parallelly connected sampling resistors R32 and R33 coupled between the silicon-controlled rectifier element T1 and the power ground, and a first filter circuit coupled to the sampling resistors R32 and R33, and the first filter circuit includes a resistor R1 and a capacitor C1. One signal input terminal of the controller is coupled to the first filter circuit so as to receive a sampling signal S120.

Referring to FIG. 2, in one illustrative embodiment, the second voltage acquisition circuit includes a voltage divider circuit coupled to a current flow-out terminal H2 of the sensing element 14, and a second filter circuit coupled to the voltage divider circuit. The voltage divider circuit consists of resistors R64 and R16. The second filter circuit consists of a resistor R15 and a capacitor C6. One signal input terminal of the controller is coupled to the second filter circuit to receive a sampling signal S150. Further, in order to protect the controller, a clamping diode D3 is further disposed on the second voltage acquisition circuit.

Figure 3:
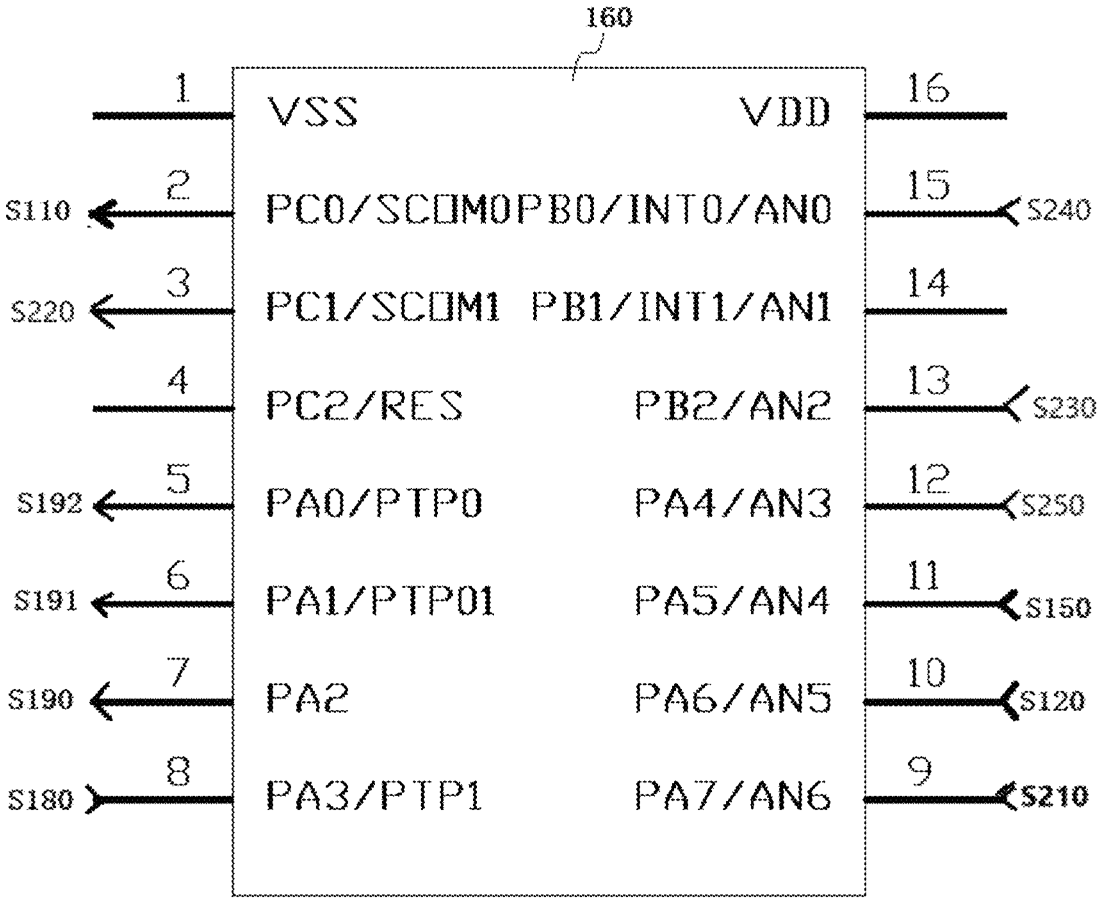
FIG. 3 is a schematic diagram showing pins of a controller in one example embodiment of the safe heating circuit of the present invention.

In some embodiments, the controller 16 may be a CPU, an MCU or other programmable devices. Referring to FIG. 3, in an illustrative example, the controller is a microcomputer unit (MCU) 160, which has a plurality of signal input/output pins (pins 1-16), may receive signals through the signal input pins, and can output signals based on a configured program through the corresponding signal output pins. In the present illustrative example, the pin 2 (PC0) of the microcomputer unit (MCU) 160 is configured to output an on-off control signal S110, a pin 10 (PA6/AN5) and a pin 11 (PA5/AN4) are respectively configured to receive a sampling signal S120 and a sampling signal S150. In the subsequent embodiment, the signals received or output by the controller will be identified in the same manner.

Referring to FIG. 1, in some embodiments, the safe heating circuit of the present invention further includes a level adjusting circuit 18, the level adjusting circuit 18 is coupled to one signal input terminal of the controller 16 and is configured to generate a level adjusting signal, and the corresponding controller 16 is further configured to adjust the set temperature voltage based on the level adjusting signal.

Figure 4:
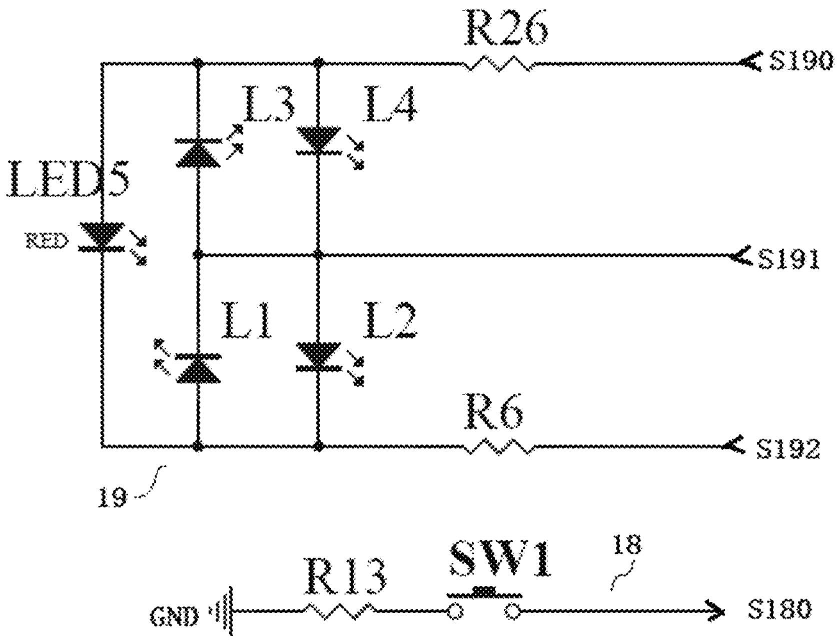
FIG. 4 is a schematic diagram of a display circuit and a level adjusting circuit in one example embodiment of the safe heating circuit of the present invention.

Referring to FIG. 4, in an illustrative example, the level adjusting circuit 18 includes a switch SW1 and a grounding resistor R13. By pressing the switch SW1, a level adjusting signal S180 may be generated, so that the controller 16 may adjust the set temperature voltage based on the level adjusting signal S180.

Referring to FIG. 1, in some embodiments, the safe heating circuit of the present invention further includes a display circuit 19. The display circuit 19 is coupled to at least one signal output terminal of the controller 16, and is configured to display the current setting level based on the display control signal output by the controller.

Referring to FIG. 4, in an illustrative example, the display circuit 19 includes light emitting diodes L1-L4 and LEDS, and receives display control signals S190-S192 from the controller to further display the current setting level in different combination manners.

A working principle of the safe heating circuit in the present embodiment will be further illustrated hereafter in combination with the above illustrative embodiments.

At the beginning of working, the controller 16 outputs a continuous trigger pulse to the first switching element (silicon-controlled rectifier element T1) to switch on the first switching element (silicon-controlled rectifier element T1), and at this moment, the PTC electric heating element 10 is powered on and heats. The resistors R33 and R32 in the first voltage acquisition circuit form a sampling resistor, the sampling voltage signal is subjected to current limiting filtering by the first filter circuit formed by the resistors R1 and C1 to form a sampling signal S120 to enter the controller. When the temperature rises, the resistance value of the PTC electric heating element 10 increases, so that the sampling voltage reduction of the first voltage acquisition circuit is caused. When detecting that the sampling voltage is lower than the set temperature voltage corresponding to the current configured level, the controller stops outputting the trigger pulse to the first switching element (silicon-controlled rectifier element T1), further switches off the first switching element (silicon-controlled rectifier element T1), and stops heating. Then, along with the temperature drop, the resistance value of the PTC electric heating element 10 will slowly decrease. When the resistance value decreases, the sampling voltage acquired by the first voltage sampling circuit rises. When detecting that the sampling voltage is higher than the set temperature voltage corresponding to the current configured level, the controller outputs a continuous trigger pulse to the first switching element (silicon-controlled rectifier element T1) to switch on the first switching element (silicon-controlled rectifier element T1) to further switch on a power loop of the PTC electric heating element 10 and to recover heating. In the heating process, the two processes are alternately performed, and the purpose of constant temperature is achieved through cyclic control.

In another aspect, when the PTC electric heating element 10 is powered on and heats, an alternating-current voltage flowing through the PTC electric heating element forms a leakage current through the NTC element 13 to enter the sensing element 14, the leakage current is further sampled by the voltage divider circuit (resistors R64 and R16) in the second voltage acquisition circuit, and is filtered by the second filter circuit (resistor R15 and capacitor C6) to form a sampling signal S150 to enter the controller, so that the NTC temperature voltage is acquired. When the NTC temperature voltage is lower than the set temperature voltage corresponding to the current configured level, the controller outputs the continuous trigger pulse to the first switching element (silicon-controlled rectifier element T1) to switch on the first switching element (silicon-controlled rectifier element T1), and at this moment, the PTC electric heating element 10 keeps the power-on state and heats. When the NTC element senses that the overall temperature or local temperature exceeds the NTC protection set value, the leakage current entering the sensing element 14 through the NTC element 13 increases, further causing the rise of the voltage signal (NTC temperature voltage) acquired by the second voltage. When detecting that the NTC temperature voltage is higher than the set temperature voltage corresponding to the current configured level, the controller stops outputting the trigger pulse to the first switching element (silicon-controlled rectifier element T1) to switch off the first switching element (silicon-controlled rectifier element T1), further switches off the power loop of the PTC electric heating element 10, and stops heating.

Based on the above principle, the safe heating circuit in the above illustrative embodiments can realize the precise control on the heating temperature, and the occurrence of safety accidents caused by local overheating of a heating wire can be avoided.

Figure 5:
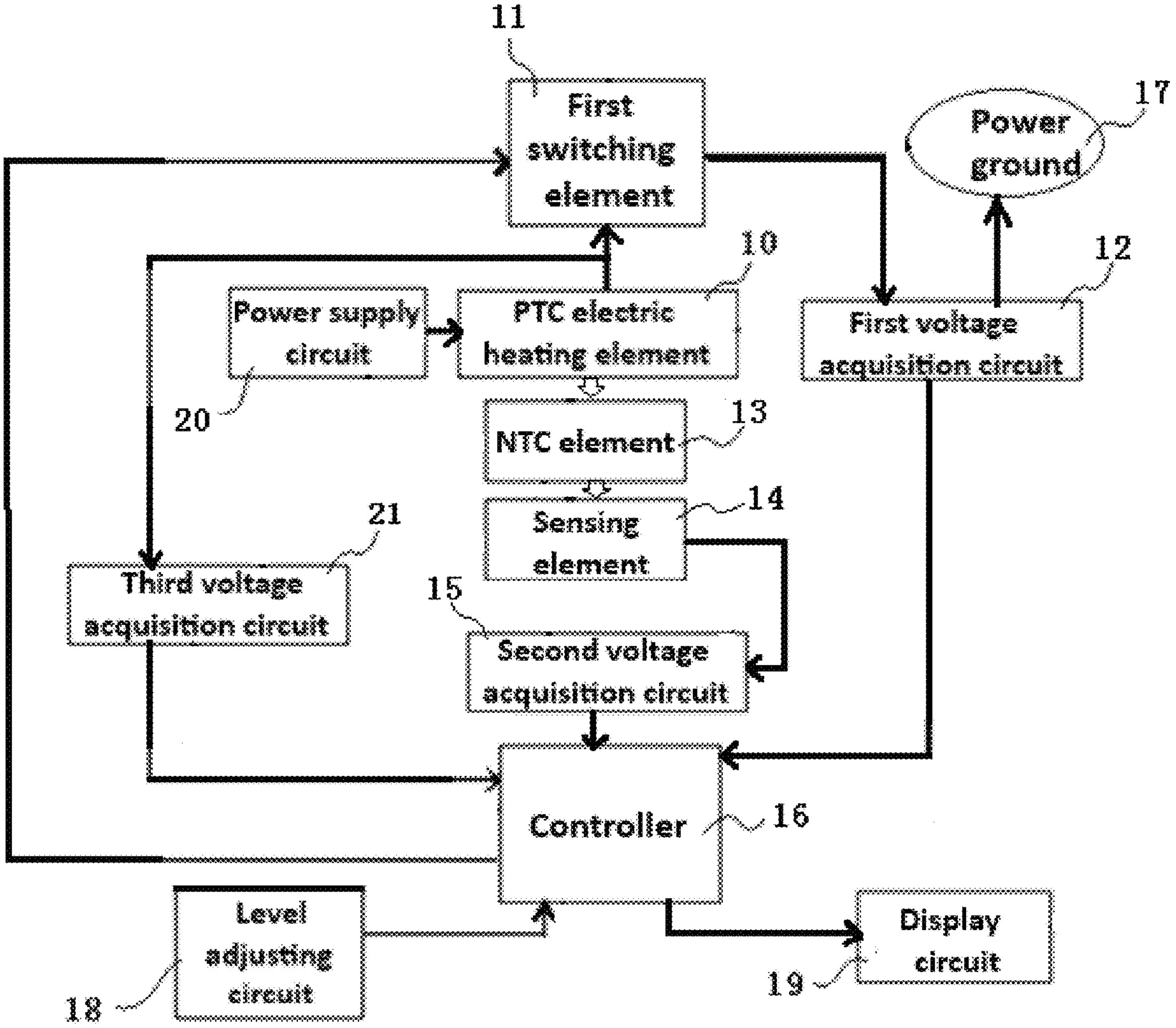
FIG. 5 is a functional block diagram of another example embodiment of the safe heating circuit of the present invention.

FIG. 5 is a functional block diagram of the safe heating circuit in another example embodiment of the present invention. Referring to FIG. 5, a safe heating circuit includes: a PTC electric heating element 10, generating heat when being electrified; a first switching element 11, coupled into a ground loop of the PTC electric heating element 10 and configured to switch on or off a power loop of the PTC electric heating element 10 based on an on-off control signal; a first voltage acquisition circuit 12, configured to sample a first temperature voltage based on a ground current of the PTC electric heating element 10; an NTC element 13, disposed between the PTC electric heating element 10 and a sensing element 14; the sensing element 14, configured to receive a leakage current from the PTC electric heating element 10 transmitted by the NTC element 13; a second voltage acquisition circuit 15, configured to sample a second temperature voltage based on the leakage current; a controller 16, configured to compare the first temperature voltage or the second temperature voltage to a set temperature voltage and output the on-off control signal based on a comparison result; and a third voltage acquisition circuit 21, coupled to a power supply end of the first switching element 11. Correspondingly, the controller 16 is further configured to detect an open-circuit voltage acquired by the third voltage acquisition circuit 21 when the first switching element 11 is switched off, judge the PTC electric heating element 10 and the first switching element 11 to be in a normal state if the open-circuit voltage is at a high level, and judge the PTC electric heating element 10 or the first switching element 11 to be in a fault state if the open-circuit voltage is at a low level.

As a further improvement solution, in the present example embodiment, the controller 16 is further configured to detect the first temperature voltage sampled by the first voltage acquisition circuit 12 and compare the first temperature voltage to a first preset threshold value when detecting that the open-circuit voltage is at the low level in a switch-off state of the first switching element 11, judge the PTC electric heating element 10 to be in a fault (open-circuit) state if the first temperature voltage is lower than the first preset threshold value, and judge the first switching element 11 to be in a fault (short-circuit) state if the first temperature voltage is higher than the first preset threshold value.

Figure 6:
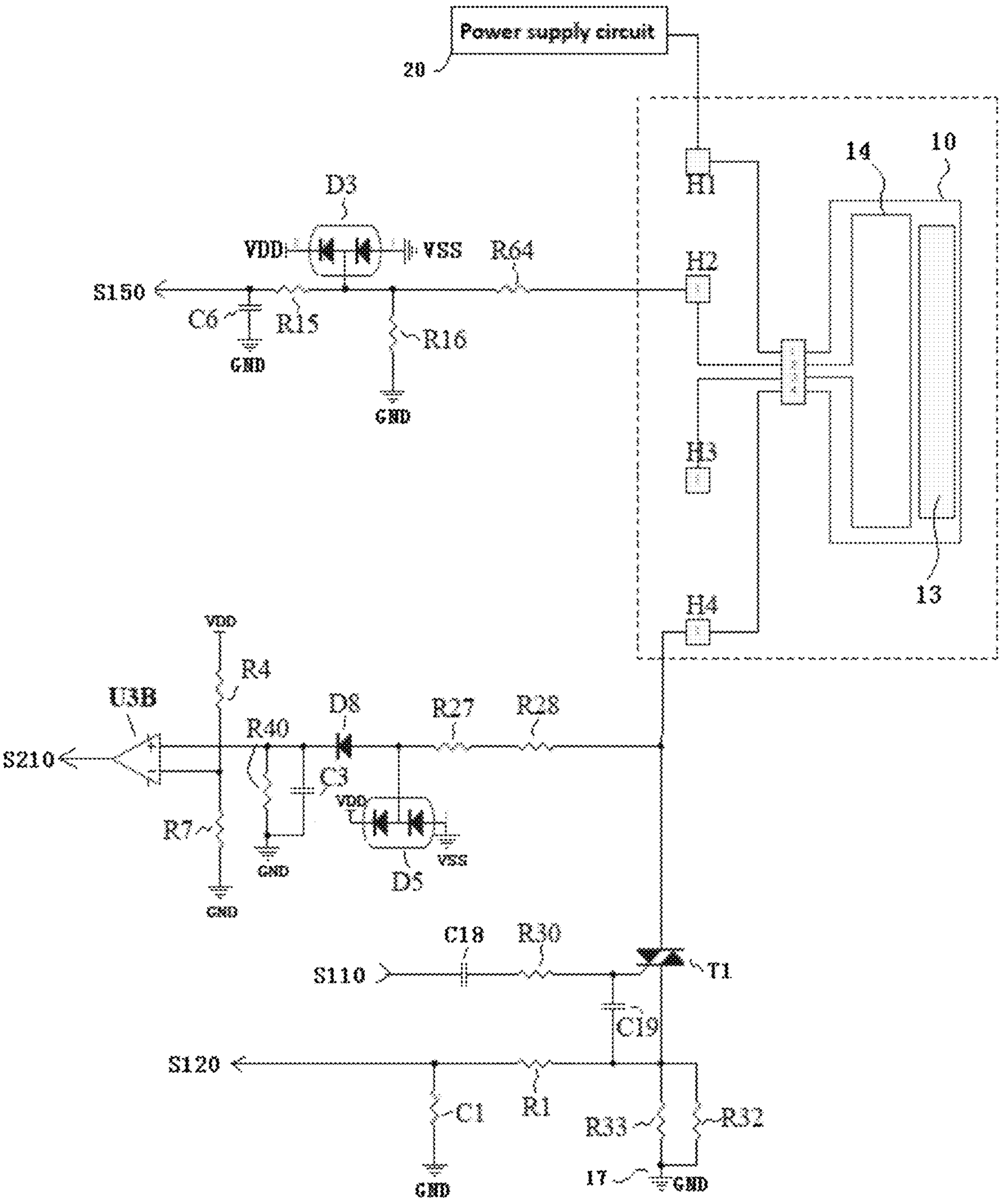
FIG. 6 is a schematic circuit diagram of another example embodiment of the safe heating circuit of the present invention.

Referring to FIG. 6, in an illustrative embodiment, the third voltage acquisition circuit includes a first comparator U3B, a positive input terminal of the first comparator U3B is coupled to a power supply end of the first switching element (silicon-controlled rectifier element T1) through a third filter circuit consisting of a resistor R40, a capacitor C3 and a diode D8 and a first current limiting circuit consisting of resistors R27 and R28, a reverse input terminal is coupled to a voltage divider circuit consisting of resistors R4 and R7 and is configured to receive a reference voltage, and an output terminal is coupled to one signal input terminal of the controller, and is configured to output an open-circuit voltage signal S210. The illustrative examples of the first voltage acquisition circuit and the second voltage acquisition circuit are similar to those in the above embodiments, so they are not repeated herein.

A working principle of the safe heating circuit in the present embodiment will be further illustrated hereafter in combination with the above illustrative embodiments.

When the first switching element 11 is switched off, the controller 16 detects the open-circuit voltage (the open-circuit voltage signal S210 output from the output terminal of the first comparator U3B) acquired by the third voltage acquisition circuit 21, and if the open-circuit voltage is at a high level, it shows that the first switching element 11 is normally switched off, so that the PTC electric heating element 10 or the first switching element 11 is judged to be in a normal state. If the open-circuit voltage is at a low level, the PTC electric heating element 10 may generate an open circuit, or the first switching element 11 generates a fault and cannot be normally switched off, so that the PTC electric heating element 10 or the first switching element 11 is judged to generate a fault.

At this moment, the controller 16 further detects the first temperature voltage sampled by the first voltage acquisition circuit 12 and compares the first temperature voltage to the first preset threshold value. If the first temperature voltage is lower than the first preset threshold value, it shows that the PTC electric heating element 10 generates an open circuit, resulting in the low level of the grounding end H4, so that the PTC electric heating element 10 is judged to generate a fault (open circuit). If the first temperature voltage is higher than the first preset threshold value, it shows that the first switching element 11 generates a fault and cannot be normally switched off, the reason is generally the failure short circuit of the first switching element 11, and the grounding end voltage generation is caused, so that the first switching element 11 is judged to generate a fault (short circuit). The first preset threshold value may be set according to practical conditions.

Referring to FIG. 1 and FIG. 5, in some embodiments, the safe heating circuit of the present invention further includes a power supply circuit 20, the power supply circuit is coupled to an external power supply to provide an alternating-current voltage for the PTC electric heating element 10 and is configured with a voltage conversion circuit, and the voltage conversion circuit is configured to convert the alternating-current voltage to a 5V low-voltage direct-current power supply.

Figure 7:
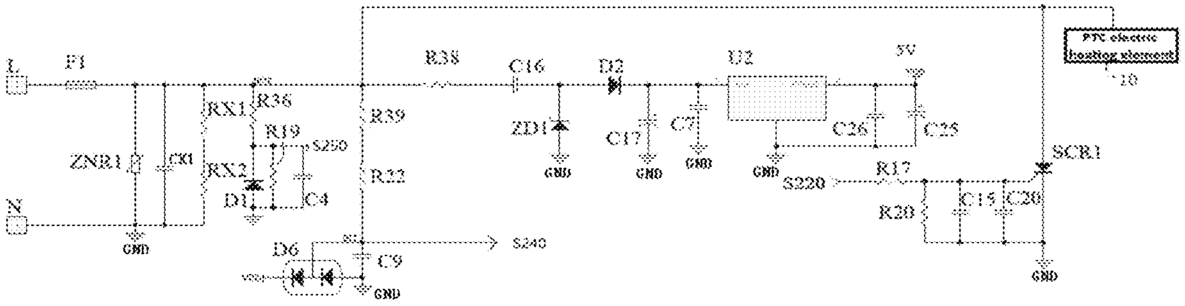
FIG. 7 is a schematic circuit diagram of a power supply circuit in one example embodiment of the safe heating circuit of the present invention.

Referring to FIG. 7, in an illustrative embodiment, the power supply circuit includes a live wire connection terminal L and a neutral wire connection terminal N configured to be coupled to an external power supply, and a fuse F1 serially connected behind the live wire connection terminal L.A protection circuit consisting of a varistor (surge receiver) ZNR1, a filter capacitor CX1 and resistors RX1 and RX2 is disposed behind the fuse F1, and then, the PTC electric heating element 10 is coupled for power supply. At the same time, a voltage conversion circuit is coupled, and includes a current limiting resistor R38, a capacitor C16, a voltage stabilizing diode ZD1, a diode D2 and filter capacitors C17 and C7, and then, a stable 5V low-voltage direct-current power supply is generated through a voltage stabilizing chip U2 and through the filtering by the capacitors C26 and C25.

Referring to FIG. 7, in an illustrative embodiment, the above power supply circuit further includes a fuse protection circuit, the fuse protection circuit includes a second switching element SCR1 coupled between a current flow-out terminal of the fuse F1 and the power ground.

Correspondingly, in some embodiments, the controller 16 is further configured to output a control signal S220 to control the second switching element SCR1 to be switched on when judging that the first switching element 11 generates a fault, at this moment, an alternating-current power supply introduced by the live wire connection terminal L is grounded through the second switching element SCR1, so that the fuse F1 is blown, so as to cut off the power supply and achieve a protection effect.

Referring to FIG. 1, in some embodiments, the safe heating circuit of the present invention further includes a power supply voltage detection circuit 25. Referring to FIG. 7, in an illustrative embodiment, the power supply voltage detection circuit is coupled between a power supply end of the PTC electric heating element 10 and one signal input terminal of the controller, and includes a resistor R36 coupled to the power supply end (current flow-out terminal of the fuse F1) of the PTC electric heating element 10, a resistor R19 grounded and connected in parallel and coupled to the resistor R36, a diode D1 and a capacitor C4. The power supply voltage detection circuit is configured to sample and generate a power supply voltage detection signal S250, so that the controller may detect the voltage at the power supply end of the PTC electric heating element after receiving the power supply voltage detection signal S250, and may further adjust the set temperature voltage, so as to avoid the influence of the power supply voltage fluctuation on the heating temperature control.

Referring to FIG. 1, in some embodiments, the safe heating circuit of the present invention further includes a zero-crossing detection circuit 24. Referring to FIG. 7, in an illustrative embodiment, the zero-crossing detection circuit is coupled between the power supply end of the PTC electric heating element 10 and one signal input terminal of the controller 16, and includes two current limiting resistors R39 and R22, a filter capacitor C9 and a clamping and switching diode D6. The zero-crossing detection circuit outputs a sampling signal S240 to one signal input terminal of the controller 16, so that the controller 16 may detect the zero-crossing abnormality of the power supply based on the sampling signal S240.

Figure 8:
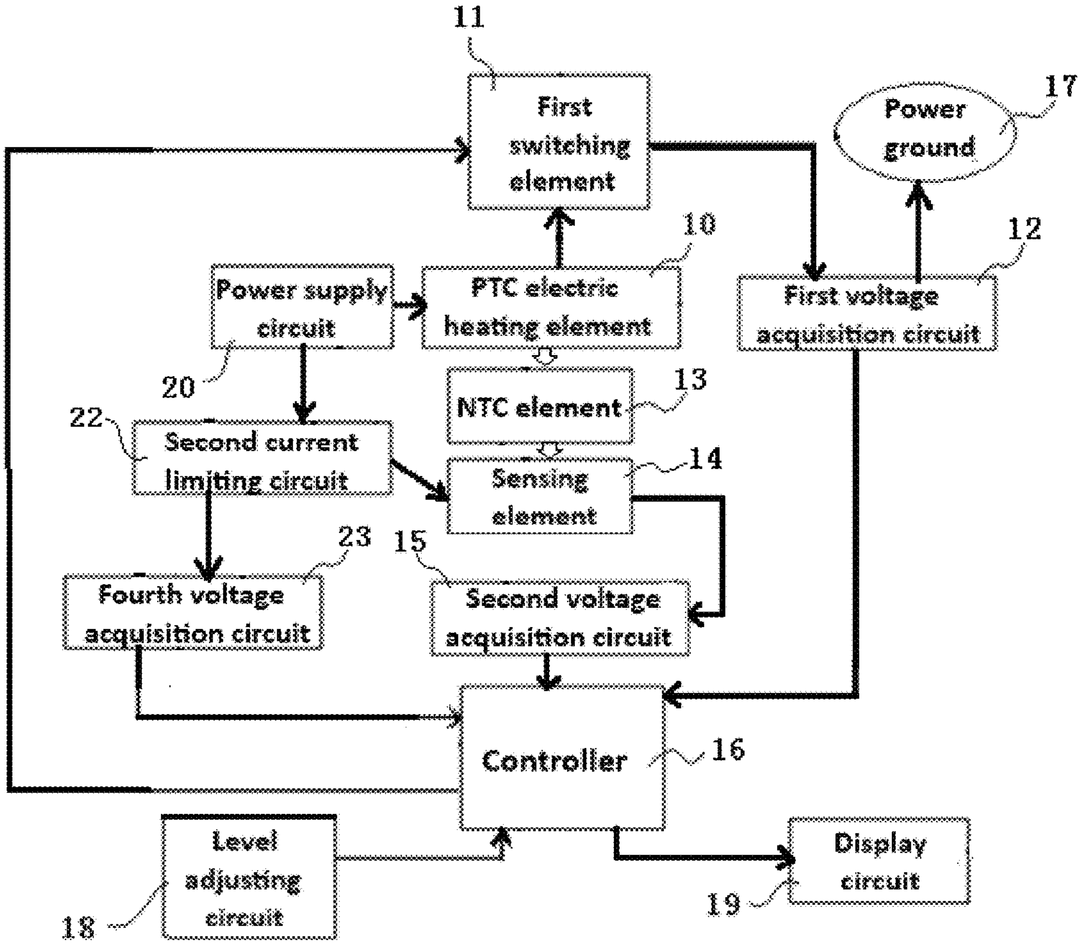
FIG. 8 is a functional block diagram of another example embodiment of the safe heating circuit of the present invention.

FIG. 8 is a functional block diagram of the safe heating circuit in another example embodiment of the present invention. Referring to FIG. 8, a safe heating circuit includes: a PTC electric heating element 10, generating heat when being electrified; a first switching element 11, coupled into a ground loop of the PTC electric heating element 10 and configured to switch on or off a power loop of the PTC electric heating element 10 based on an on-off control signal; a first voltage acquisition circuit 12, configured to sample a first temperature voltage based on a ground current of the PTC electric heating element 10; an NTC element 13, disposed between the PTC electric heating element 10 and the sensing element 14; a sensing element 14, configured to receive a leakage current from the PTC electric heating element 10 transmitted by the NTC element 13; a second voltage acquisition circuit 15, configured to sample a second temperature voltage based on the leakage current; a controller 16, configured to compare the first temperature voltage or the second temperature voltage to a set temperature voltage and output the on-off control signal based on a comparison result; and a sensing element detection circuit, including a second current limiting circuit 22 and a fourth voltage acquisition circuit 23. A current flow-in terminal of the second current limiting circuit 22 is coupled to the power terminal, and the current flow-out terminal is coupled to the current flow-in terminal of the sensing element 14 and a sampling terminal of the fourth voltage acquisition circuit 22. The fourth voltage acquisition circuit 22 is configured to sample a load voltage of the current flow-in terminal of the sensing element 14. Correspondingly, the controller 16 is further configured to receive the load voltage sampling signal and compare the load voltage sampling signal to a second preset threshold value, and switch off the first switching element 11 when the load voltage is higher than the second preset threshold value.

Figure 9:
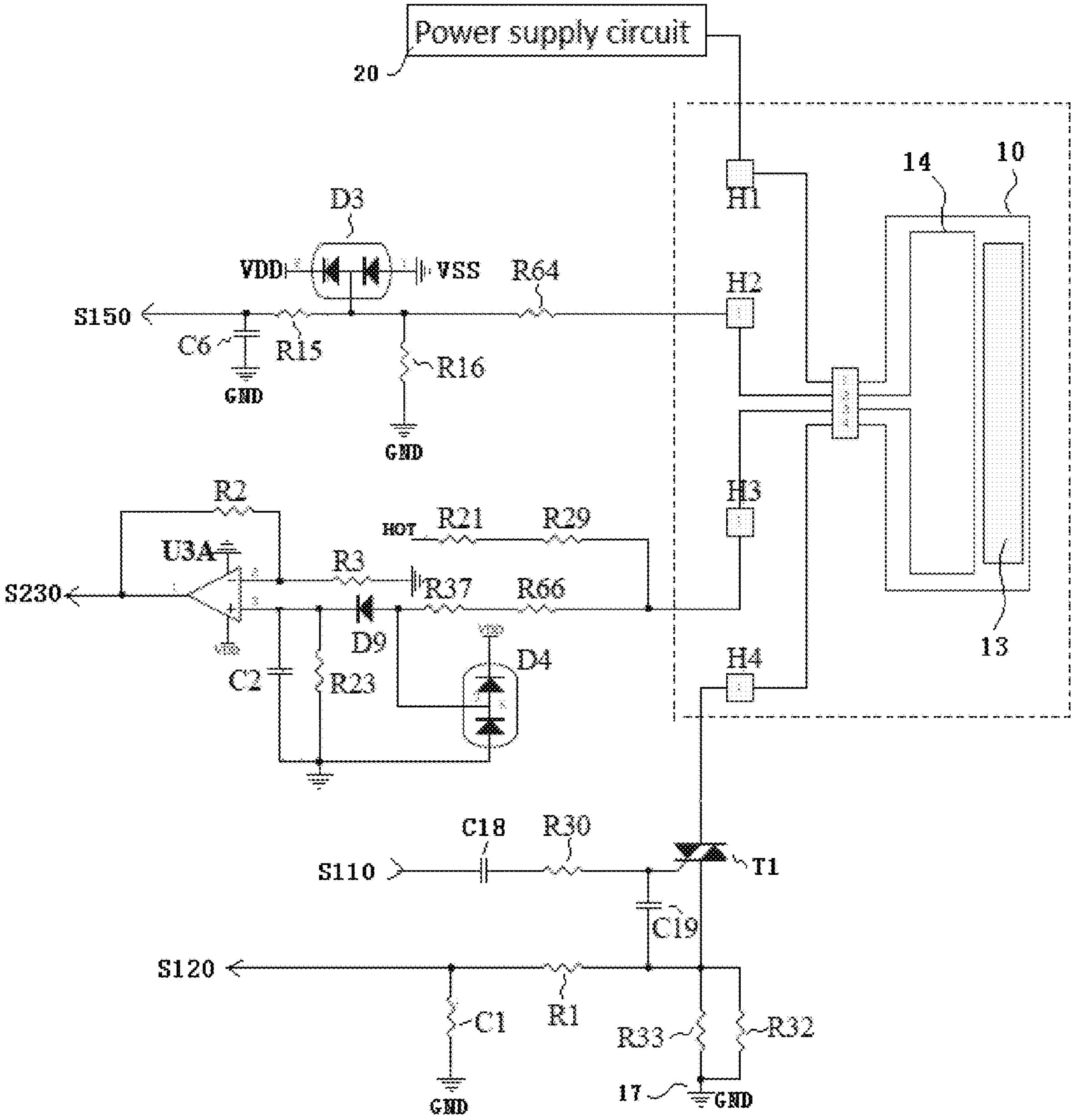
FIG. 9 is a schematic circuit diagram of another example embodiment of the safe heating circuit of the present invention.

Referring to FIG. 9, in an illustrative embodiment, the second current limiting circuit 22 includes serially connected current limiting resistors R21 and R29, one end of the second current limiting circuit is coupled to the power terminal, and the other end is used as a current flow-in terminal of the sensing element 14 coupled to the current flow-out terminal.

Referring to FIG. 9, in an illustrative embodiment, the fourth voltage acquisition circuit includes a second comparator U3A. A positive input terminal of the second comparator U3A is coupled to a current flow-out terminal of the second current limiting circuit through a fourth filter circuit consisting of a capacitor C2, a resistor R23 and a diode D9 and a third current limiting circuit consisting of resistors R37 and R66, a reverse input terminal is grounded through a resistor R3 and is coupled to an output terminal through a resistor R2, and the output terminal is coupled to one signal input terminal of the controller, and is configured to output a load voltage signal S230. Additionally, in order to protect the comparator and a controller chip, a clamping diode D4 is further coupled onto the fourth voltage acquisition circuit.

In the illustrative embodiment, the illustrative examples of the first voltage acquisition circuit and the second voltage acquisition circuit are similar to the above embodiments, so they are not repeated herein.

A working principle of the safe heating circuit in the present embodiment will be further illustrated hereafter in combination with the above illustrative embodiments.

Figure 10:
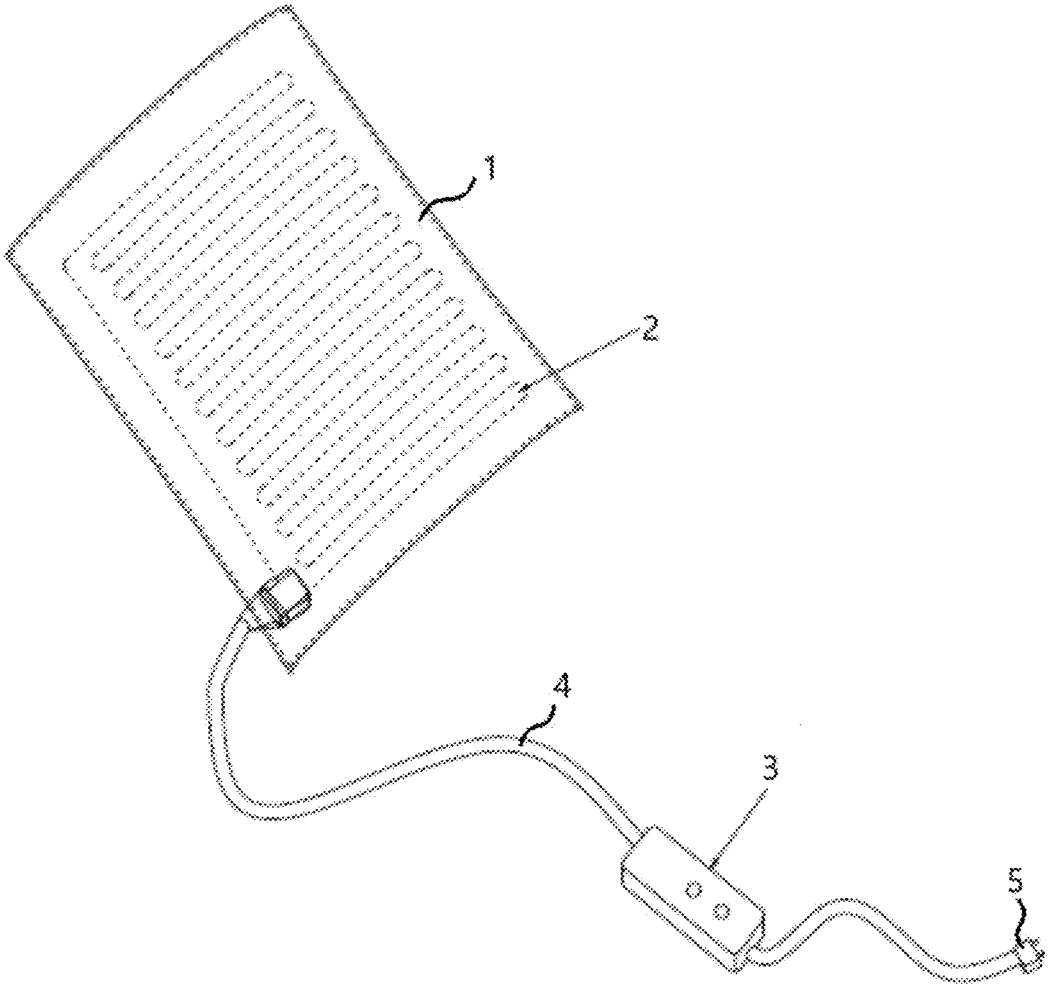
FIG. 10 is a schematic diagram of one example embodiment of an electric blanket configured with the safe heating circuit of the present invention.

When the sensing element 14 normally works, the current guided in from the second current limiting circuit is divided into two paths, one path flows into the sensing element 14 from the current flow-in terminal H3 of the sensing element 14, and flows out from the current flow-out terminal H2 to enter the second voltage acquisition circuit consisting of resistors R64, R16, R15 and a capacitor C6, and the other path enters the fourth voltage acquisition circuit. At this moment, the load voltage signal S230 received by the controller and sampled by the fourth voltage acquisition circuit is a stable voltage value. When the sensing element 14 is switched off due to a fault, the voltage at its current flow-in terminal H3 will rise, the load voltage sampled by the fourth voltage acquisition circuit generates a corresponding change. When the controller detects the change, the sensing element 14 may be judged to generate a fault (open circuit), so that the first switching element (silicon-controlled rectifier element T1) is switched off, and a warning signal is given through a display circuit. FIG. 10 shows another example embodiment of the present invention, which is an electric blanket configured with the safe heating circuit according to one or more of the above embodiments. The electric blanket includes: a blanket body 1; and the safe heating circuit shown by one or more of the above embodiments. The PTC electric heating element in the safe heating circuit is a PTC electric heating wire distributed in the blanket body 1. The NTC element and the sensing element are disposed in parallel to the PTC electric heating wire, and are coupled to a control box 3 through a conductor 4. Portions such as the controller, the first switching element, the level adjusting circuit and the display circuit are disposed in the control box 3, the power supply circuit is also integrated in the control box 3, and electricity is taken through a plug 5.

Figure 11:
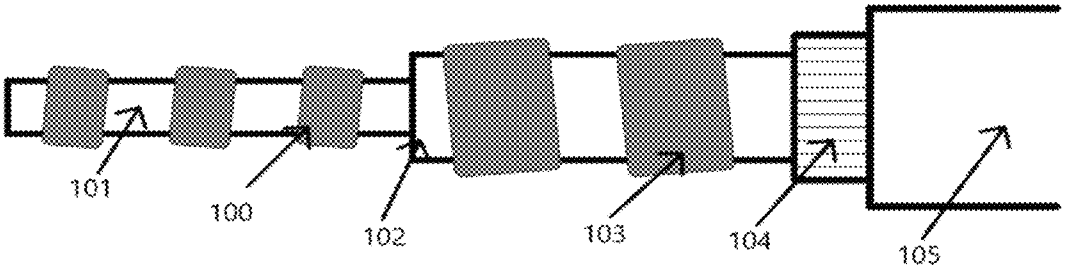
FIG. 11 is a schematic diagram of an integral arrangement structure of a PTC electric heating wire, an NTC layer and a temperature-sensitive wire in one example embodiment of the electric blanket configured with the safe heating circuit of the present invention.

Referring to FIG. 11, in an illustrative embodiment, the PTC electric heating wire, the NTC element and the sensing element are in integral integrated arrangement. The PTC electric heating wire 100 is spirally wound on a core 101, and the NTC element is an NTC material layer wrapping the PTC electric heating wire 100 and having NTC characteristics. The sensing element is a conductive wire 103 spirally wound on the NTC material layer. A shielding layer 104 further wraps the outer side of the conductive wire 103, and an insulation layer 105 is disposed at the outermost layer. Optionally, the core 101 is made of PET, and the shielding layer 104 is a tin-copper alloy material. Materials of the PTC electric heating wire, the NTC element and the sensing element may be selected according to practical requirements.

It should be noted that, in some embodiments, the electric blanket of the present invention can be configured with a certain safe heating circuit shown in the above embodiments, or it can be comprehensively configured with a plurality of safe heating circuits shown in the above embodiments to achieve better temperature control and protection purposes and achieve higher safety. Since the implementations and working principles of the safe heating circuits have been described in detail in the above embodiments, they are not repeated herein.

The descriptions in the above embodiments are merely used to facilitate the understanding of the method of the present invention and the core idea thereof. It should be noted that those of ordinary skill in the art may also make several improvements and modifications on the present invention without departing from the principle of the present invention, these improvements and modifications also falling within the scope of protection of the claims of the present invention.

The invention claimed is:

1. A safe heating circuit, comprising:

a PTC electric heating element, generating heat when being electrified;

a first switching element, coupled into a ground loop of the PTC electric heating element and configured to switch on or off a power loop of the PTC electric heating element based on an on-off control signal;

a first voltage acquisition circuit, configured to sample a first temperature voltage based on a ground current of the PTC electric heating element;

an NTC element, disposed between the PTC electric heating element and a sensing element;

the sensing element, configured to receive a leakage current from the PTC electric heating element transmitted by the NTC element;

a second voltage acquisition circuit, configured to sample a second temperature voltage based on the leakage current; and a controller, configured to compare the first temperature voltage or the second temperature voltage to a set temperature voltage and output the on-off control signal based on a comparison result.

2. The safe heating circuit according to claim 1, wherein the first switching element is a silicon-controlled rectifier element, and the controller outputs a continuous trigger pulse used as the on-off control signal to control the silicon-controlled rectifier element to be switched on.

3. The safe heating circuit according to claim 1, wherein the first voltage acquisition circuit comprises a first sampling resistor coupled between the first switching element and a power ground, and a first filter circuit coupled to the first sampling resistor, and one signal input terminal of the controller is coupled to the first filter circuit to receive a sampling signal.

4. The safe heating circuit according to claim 1, wherein the second voltage acquisition circuit comprises a voltage divider circuit coupled to a current flow-out terminal of the sensing element, and a second filter circuit coupled to the voltage divider circuit, and one signal input terminal of the controller is coupled to the second filter circuit to receive a sampling signal.

5. The safe heating circuit according to claim 1, further comprising a level adjusting circuit, wherein the level adjusting circuit is coupled to one signal input terminal of the controller and configured to generate a level adjusting signal, and the controller is further configured to adjust the set temperature voltage based on the level adjusting signal.

6. The safe heating circuit according to claim 5, further comprising a display circuit, wherein the display circuit is coupled to at least one signal output terminal of the controller and configured to display a current setting level based on a display control signal output by the controller.

7. The safe heating circuit according to claim 6, further comprising a third voltage acquisition circuit, wherein the third voltage acquisition circuit is coupled to a power supply end of the first switching element, and the controller is further configured to detect an open-circuit voltage acquired by the third voltage acquisition circuit when the first switching element is switched off, judge the PTC electric heating element and the first switching element to be in a normal state if the open-circuit voltage is at a high level, and judge the PTC electric heating element or the first switching element to be in a fault state if the open-circuit voltage is at a low level.

8. The safe heating circuit according to claim 7, wherein the controller is further configured to detect the first temperature voltage and compare the first temperature voltage to a first preset threshold value when detecting that the open-circuit voltage is at the low level in a switch-off state of the first switching element, judge the PTC electric heating element to be in a fault state if the first temperature voltage is lower than the first preset threshold value, and judges the first switching element to be in a fault state if the first temperature voltage is higher than the first preset threshold value.

9. The safe heating circuit according to claim 7, wherein the third voltage acquisition circuit comprises a first comparator, a positive input terminal of the first comparator is coupled to a power supply end of the first switching element through a third filter circuit and a first current limiting circuit, a reverse input terminal is configured to receive a reference voltage, and an output terminal is coupled to one signal input terminal of the controller.

10. The safe heating circuit according to claim 8, further comprising a fuse protection circuit, wherein the fuse protection circuit comprises a fuse coupled between a power terminal and the PTC electric heating element, and a second switching element coupled between a current flow-out terminal of the fuse and the power ground, and the controller is further configured to output a control signal to control the second switching element to be switched on so as to blow the fuse when judging that the first switching element is in a fault state.

11. The safe heating circuit according to claim 6, further comprising a sensing element detection circuit, wherein the sensing element detection circuit comprises a second current limiting circuit and a fourth voltage acquisition circuit; a current flow-in terminal of the second current limiting circuit is coupled to a power terminal, and the current flow-out terminal is coupled to the current flow-in terminal of the sensing element and a sampling terminal of the fourth voltage acquisition circuit; the fourth voltage acquisition circuit is configured to sample a load voltage of the current flow-in terminal of the sensing element; and the controller is further configured to receive the load voltage, compare the load voltage to a second preset threshold value, and switch off the first switching element when the load voltage is higher than the second preset threshold value.

12. The safe heating circuit according to claim 11, wherein the fourth voltage acquisition circuit comprises a second comparator, a positive input terminal of the second comparator is coupled to a current flow-out terminal of the second current limiting circuit through a fourth filter circuit and a third current limiting circuit, a reverse input terminal is grounded, and an output terminal is coupled to one signal input terminal of the controller.

13. The safe heating circuit according to claim 6, further comprising a power supply circuit, wherein the power supply circuit is coupled to an external power supply to provide an alternating-current voltage for the PTC electric heating element and is configured with a voltage conversion circuit, and the voltage conversion circuit is configured to convert the alternating-current voltage into a low-voltage direct-current power supply.

14. The safe heating circuit according to claim 13, further comprising a power supply voltage detection circuit, wherein the power supply voltage detection circuit is coupled between the power supply end of the PTC electric heating element and one signal input terminal of the controller, and is configured to detect a power supply end voltage of the PTC electric heating element, and the controller is further configured to adjust the set temperature voltage based on the power supply end voltage of the PTC electric heating element detected by the power supply voltage detection circuit.

15. The safe heating circuit according to claim 13, further comprising a zero-crossing detection circuit, wherein the zero-crossing detection circuit is coupled between the power supply end of the PTC electric heating element and one signal input terminal of the controller, and comprises at least one current limiting resistor, a filter capacitor, and a clamping and switching diode.

16. An electric blanket, comprising:

a blanket body; and a safe heating circuit, comprising:

a PTC electric heating element, generating heat when being electrified;

a first switching element, coupled into a ground loop of the PTC electric heating element and configured to switch on or off a power loop of the PTC electric heating element based on an on-off control signal;

a first voltage acquisition circuit configured to sample a first temperature voltage based on a ground current of the PTC electric heating element;

an NTC element disposed between the PTC electric heating element and a sensing element;

the sensing element, configured to receive a leakage current from the PTC electric heating element transmitted by the NTC element;

a second voltage acquisition circuit, configured to sample a second temperature voltage based on the leakage current; and a controller, configured to compare the first temperature voltage or the second temperature voltage to a set temperature voltage and output the on-off control signal based on a comparison result;

wherein the PTC electric heating element is an electric heating wire distributed in the blanket body and having PTC characteristics.

17. The electric blanket according to claim 16, wherein the PTC electric heating element, the NTC element and the sensing element are in integral integrated arrangement, the PTC electric heating element is an electric heating wire spirally wound on a core, the NTC element is an NTC material layer wrapping the electric heating wire, and the sensing element is a sensing wire spirally wound on the NTC material layer, and is externally provided with a shielding layer and an insulation layer wrapping the sensing wire.

* * * * *